United States Patent [19]

Menich et al.

[11] Patent Number: 5,287,544

[45] Date of Patent: Feb. 15, 1994

[54] METHOD OF CHANNEL ASSIGNMENT BY MATCHING CHANNEL INTERFERENCE WITH CHANNEL LINK LOSS

[75] Inventors: Barry J. Menich, Schaumburg; Jeffrey D. Bonta, Arlington Heights, both of Ill.

[73] Assignee: Motorola, Inc., Schaumburg, Ill.

[21] Appl. No.: 777,950

[22] Filed: Oct. 17, 1991

[51] Int. Cl.$^5$ .............................................. H04Q 7/00
[52] U.S. Cl. ...................... 455/33.1; 455/33.2; 455/54.1; 455/62; 455/63; 379/59; 379/60
[58] Field of Search ............ 455/33.1, 33.2, 62–63, 455/67.3, 54.1, 54.2, 34.1, 34.2; 379/60, 59

[56] References Cited

U.S. PATENT DOCUMENTS

| | | | |
|---|---|---|---|
| 4,670,906 | 6/1987 | Thro | 455/56.1 |
| 4,736,453 | 4/1988 | Schloemer | 455/62 |
| 5,038,399 | 8/1991 | Bruckert | 455/62 |
| 5,093,927 | 3/1992 | Shanley | 455/34.1 |
| 5,203,008 | 4/1993 | Yasuda et al. | 455/62 |
| 5,203,012 | 4/1993 | Patsiokas et al. | 455/34.1 |

Primary Examiner—Reinhard J. Eisenzopf
Assistant Examiner—Andrew Faile
Attorney, Agent, or Firm—Jon P. Christensen

[57] ABSTRACT

A method is offered of achieving a desired C/I ratio within a cellular system, at reduced transmitter power levels, by measuring a signal loss on a downlink between a base site transmitter (31) and mobile receiver (20) and calculating an uplink signal magnitude at a base site receiver. A communication channel is then selected from a number of communication channels based upon comparison of the uplink signal magnitude with pre-measured interference levels for each channel of the number of channels to produce a desired C/I ratio.

11 Claims, 4 Drawing Sheets

METHOD OF CHANNEL ASSIGNMENT BY MATCHING CHANNEL INTERFERENCE WITH CHANNEL LINK LOSS

FIELD OF THE INVENTION

This invention relates to communication systems and more specifically to cellular communication systems.

BACKGROUND OF THE INVENTION

Cellular communication systems are known. Such systems are, typically, comprised of a number of remote base sites, each having a service coverage area, and a number of cellular telephones (communication units). Remote base sites are typically dispersed throughout a geographic area providing local communication services to communication units passing through the area from the nearest remote base site. Within the geographic area, service coverage areas of adjacent remote sites are often arranged to partially overlap in such a manner as to provide a substantially continuous coverage area in which a communication unit receiving service from one remote site may be handed off to an adjacent remote site with no interruption in service. The Groupe Special Mobile (GSM) Pan-European cellular system, as specified in GSM recommendations available from the European Telecommunications Standards Institute (ETSI) and incorporated herein by reference, is an example of just such a system using such a format.

Such systems, typically, provide communication access to communication units within service coverage areas (cells) on an assigned frequency spectrum. The assigned frequency spectrum is divided into a number of operating frequencies ($f_1$, $f_2$, ... $f_{7n+7}$).

To maximize the capacity of a cellular system within a given geographic area, operating frequencies must be reused among the cells in such a manner that mutual interference does not exceed a maximum threshold level. Mutual interference, within such systems, is maintained below the maximum threshold level through the use of a reuse pattern.

Under the reuse pattern a list of available, idle channels is maintained at each remote base site serving a cell. The list of available frequencies is, in turn, further divided into a list of useable channels based upon interference measurements.

The list of useable channels available at remote base sites, for handoffs or for allocation to communication units requesting access, is determined from interference measurements performed by the base sites and comparison with a cell threshold (or thresholds for defining degrees of channel quality). Channels having measurements below the highest threshold may be deemed useable while those above the threshold may be deemed not useable.

The threshold method of determining channel availability by comparison of interference measurements with thresholds works well in most cases. Communication units requesting access from locations near the base site typically experience good carrier to interference (C/I) ratios and clear audio channels. Problems arise, on the other hand, where a requesting communication unit is located near the periphery of a service coverage area or is in a poor service area. In such a case the communication unit may be operating at, or near, full output power yet still providing a signal that appears weak to the base site.

In the case where a communication unit is near the periphery of the service coverage area (because of handoff or otherwise), the allocation of a communication channel, under the threshold method, may result in a poor quality of service. In specific, if high quality channels (with low measured interference) are used indiscriminantly for calls with strong signals, then calls with weak signals may be left with only poor quality channels which may produce poor audio quality, service interruptions, and dropped calls.

Because of the importance of mobile telephone communications a need exists for a better method of selecting channels for assignment during requests for access or requests involving handoff. Such a method should take into account the vagaries of signal quality associated with geographic location.

SUMMARY OF THE INVENTION

A method is offered of achieving a desired C/I ratio within a cellular communication system. The method includes the steps of grouping channels having more similar than dissimilar interference characteristics and allocating channels to communication units based, at least in part, upon a calculated link signal loss and interference grouping.

BRIEF DESCRIPTION OF A PREFERRED EMBODIMENT

The solution to the problem of channel selection lies, conceptually, in selecting a channel (proportionate channel) with an interference level proportionate to a communicated signal level such that a desired C/I ratio is maintained. Such a selection process would measure signal loss between communication unit and base transceiver station, calculate a communicated signal power level, and assign a channel with a detected interference level equal to, or below, the level required to maintain the desired C/I ratio.

Selection of proportionate channels for assignment to communication units is determined, according to the invention, by the status of the communication unit. In one embodiment of the invention application of the proportionate channel selection process is limited to handoff. In another embodiment, use of proportionate channels may be extended to all communications traffic between an MS and BTS.

Figure 6:
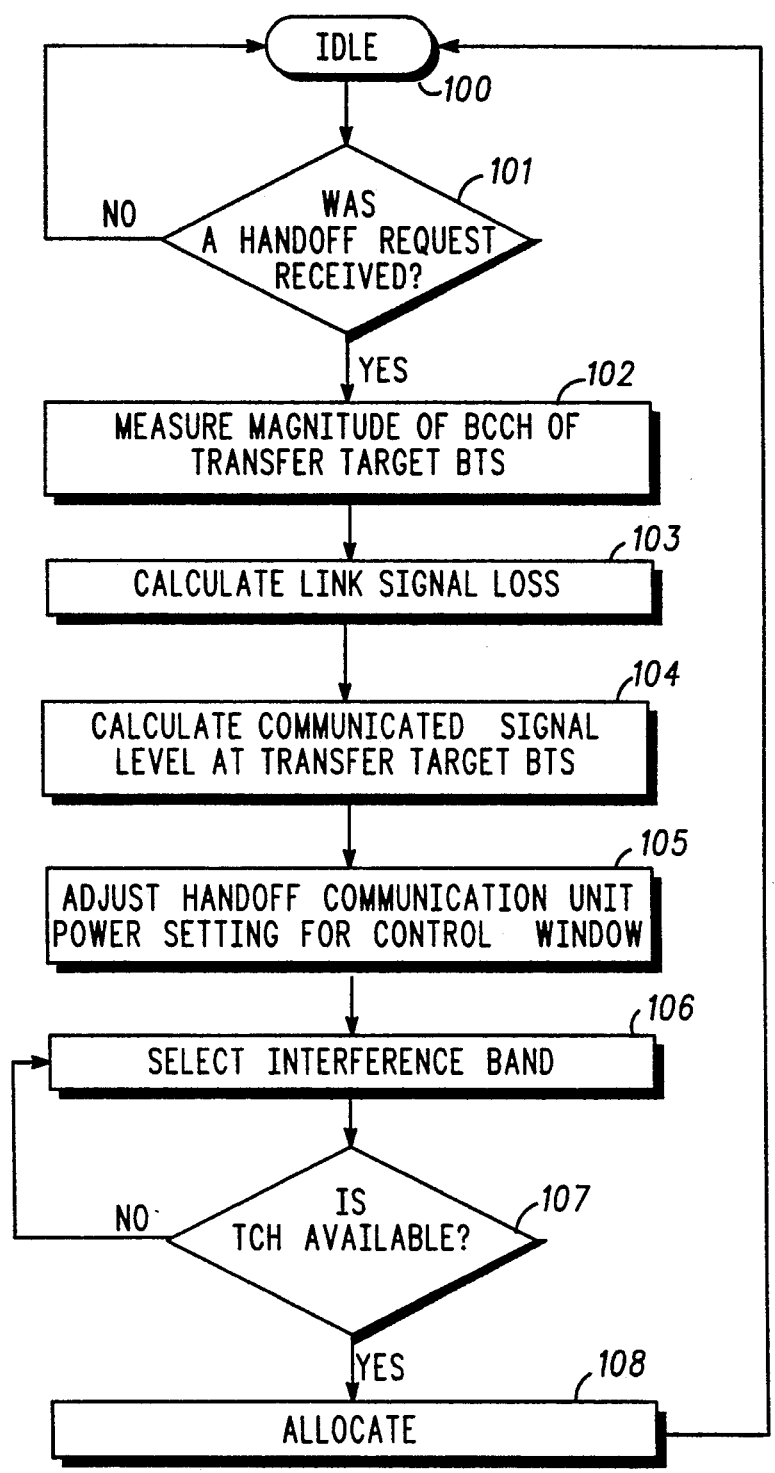
FIG. 6 depicts a flow chart of channel selection during handoff under the invention.
Figure 7:
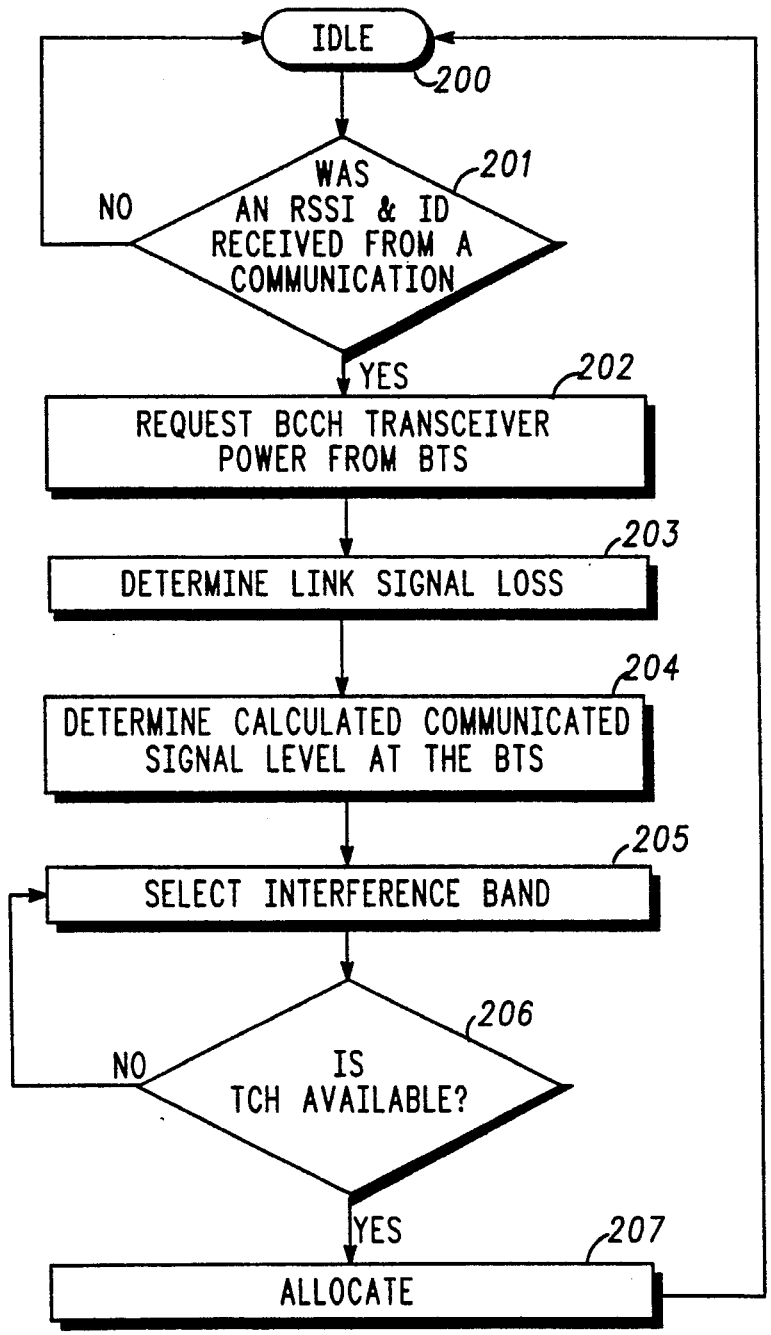
FIG. 7 depicts a flow chart of channel selection upon receipt of an access request from a communication unit.

Shown in FIG. 6 is a flow chart describing the method of selection during handoff, according to the invention. Reference will be made to the flow chart, as appropriate to understanding the invention.

Figure 1:
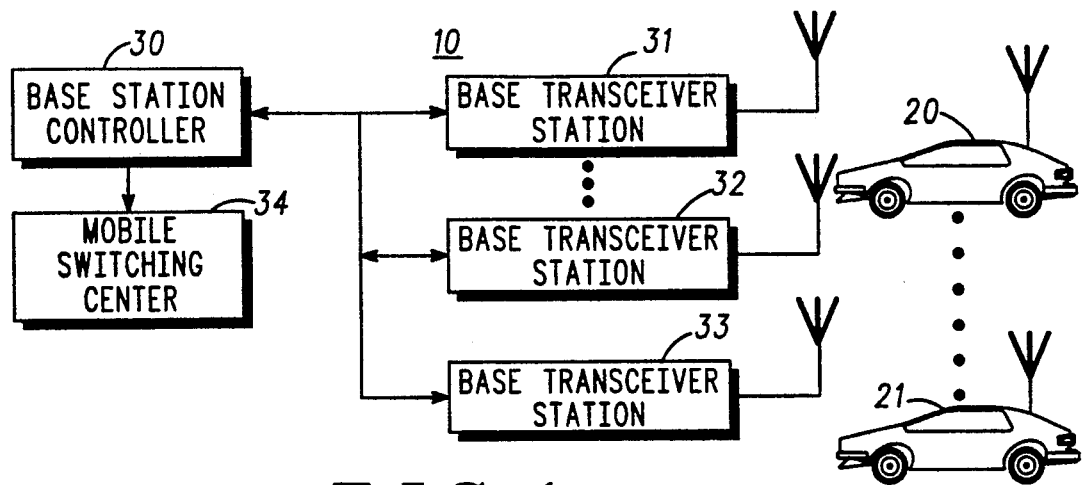
FIG. 1 comprises a block diagram of a communication system under the invention.

Referring to the block diagram, designated generally by the number 10, of FIG. 1, a portion of a GSM cellular communication system under the invention is illustrated. Included within such a system (10) is a number of communication units (20 and 21) (as used herein "communication unit" refers to mobile units or portable units), base transceiver stations (BTS) (31, 32, and 33), and a base station controller (BSC) (30). The BSC (30) is also shown interconnected with a mobile switching center (MSC) (34). Within a GSM communication system, a number of systems (10) may be interconnected to a single MSC.

Figure 2:
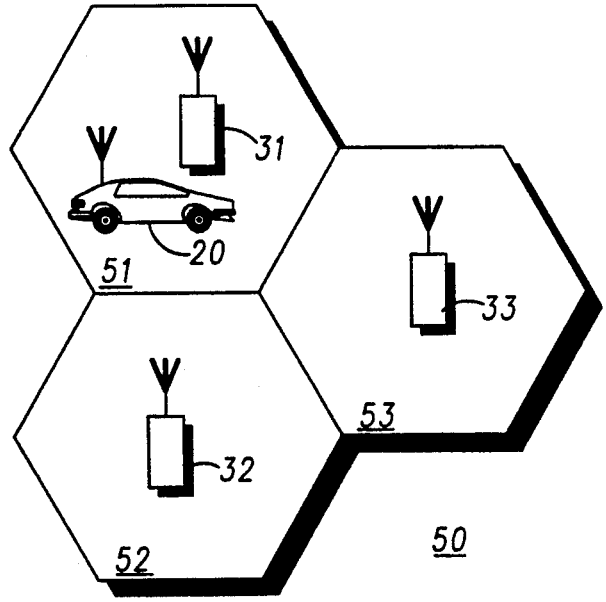
FIG. 2 depicts service coverage areas and base sites of a large geographic area within which communication services are provided.

Communication services within such a system (10) are provided within a relatively large geographic area (50) (FIG. 2) from BTSs (31, 32, and 33) distributed throughout the large geographic area (50). Each BTS (31, 32, or 33) offers communication services within a service coverage area (51, 52 and 53) inclusive of the large geographic area (50).

BTSs (31, 32, and 33), according to the invention, are constructed to scan unallocated channels assigned to the BTS and measure an interference level (e.g., received signal strength indication (RSSI) on each channel. The interference level (expressed in Watts, dbm, etc.) is then used to group channels having more similar than dissimilar interference characteristics into interference bands based upon measured levels of interference falling between an upper and a lower threshold value for each interference band.

Figure 3:
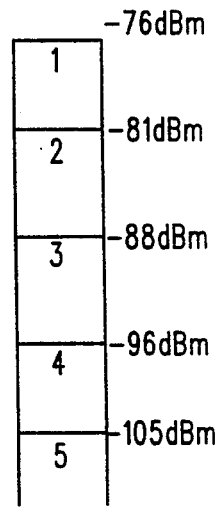
FIG. 3 depicts interference bands for use under condition of handoff, under the invention.

Shown in FIG. 3 is an example of a set of handoff interference bands, under one embodiment of the invention. In the example (FIG. 3) channels with a relatively high measured level of interference (−76 to −81 dBm) are assigned to band 1. A next level of interference (−81 to −88 dBm) are assigned to band 2. Channels with a lower level of measured interference (below −105 dBm) are assigned to band 5.

Communication units (20 and 21) and BTSs (31, 32, and 33) are constructed to exchange signals substantially as specified under GSM. Accordingly, communication units (20 and 21) request access to and are granted traffic channels (TCHs) substantially as specified under GSM recommendations.

Upon assignment of a TCH, a communication unit (20) (FIG. 2) tunes to the assigned frequency and slot and begins exchanging a communicated signal through the serving BTS (31). While exchanging the communicated signal the communication unit (20) scans for and, upon detection, measures a received signal strength indication (RSSI) of broadcast control channels (BCCHs) of nearby BTSs (31, 32 and 33). Upon detecting and measuring a BCCH the communication unit also receives and decodes an ID of the transmitting BTS (31, 32, or 33).

The communication unit (20) communicates the RSSI and ID of each detected BTS (31, 32, or 33) to the serving BTS (31) on a slow associated control channel (SACCH) associated with the assigned TCH. The RSSIs and IDs are, in turn transferred to the BSC (30) (101). RSSIs and associated IDs of as many as six, detected BTSs (31, 32, or 33) may be transmitted to the BTS (31) on the SACCH, and forwarded to the BSC (30).

During an exchange of a communicated signal the serving BTS (31) measures an RSSI of the communicated signal from the communication unit (20). The RSSI of the communicated signal is, in turn, transferred to the BSC (30) for use in determination of a need for handoff.

Under GSM, a decision to handoff a communication unit (20) to a target BTS (33) may be based upon comparison of RSSIs with threshold values, by distance of the communication unit (20) from the BTS (31), etc (see GSM Recommendation 5.08). Handoff may be initiated by the serving BTS (31) transmitting an ID of a TCH allocated for use in the transfer target cell (53).

The ID of a proportionate channel to be assigned as a TCH in the target cell during handoff, under the invention, may be determined by the BSC controlling the target BTS (33). The BSC (30) (in the case of a intra-BSS handoff) begins the determination of the proportionate channel by calculating a link signal loss between the handoff communication unit (20) and transfer target BTS (33). (In the case of an inter-BSS handoff, the MSC (34) may calculate link signal loss.)

Link signal loss between a BTS and communication unit, in general, is assumed to be identical on uplink and downlink and, in the case of a mobile assisted handoff (MAHO), is determined (103) by a comparison of the magnitude of a transmitted BCCH signal with the magnitude of the received BCCH signal, as measured by the handoff communication unit. The value of the received BCCH signal is assumed to be the most recent RSSI measurement of the BCCH signal of the transfer target BTS (33) transferred to the serving BTS (31) and BSC (30) on the SACCH from the communication unit (20). The magnitude of the transmitted BCCH signal may be determined by reference to a memory table (not shown) of stored RSSI values at the BSC (30).

In a non-MAHO case, upon receipt of a request for handoff from a serving BTS (31), and after determination, as above, of a target transfer cell, the BSC (30) sends a control command to the transfer target BTS (33) for a signal measurement of the handoff communication unit. The transfer target BTS (33) responds by measuring the transmitted signal of the handoff communication unit and transferring such measurement to the BSC (30). Link signal loss may then be determined by a comparison of handoff communication unit transmitter power with the measured signal at the target BTS (33) from the handoff communication unit. Link signal loss may then used in conjunction with communication unit transmitter power to select a proportional channel from an appropriate interference band based upon the desired C/I.

Communication unit transmitter power, according to the invention, is selected (105) to produce a communicated signal at the BTS falling as close as practical to the center of a power control box. The power control box, in one embodiment of the invention, may be selected as having an upper limit equal to the top of interference band 1 (e.g. −76 dBm). The bottom of the power control box may be selected 14 dBm below the top (e.g. −90 dBm). The center of power control box (target communicated signal level at the BTS) then becomes −83 dBm.

The desired C/I may be selectable by a system operator depending on system needs. As an example, a desired C/I ratio selected at a BTS (33) may be 11 dB. The target BTS (33) may have a transmitted power of 40 Watts (46 dBm).

The communication unit (20) may have a maximum transmitted power of 20 Watts (43 dBm). Transmission power within the communication unit (20) may be controllable in 2 dB steps (e.g. power control level 0 is 43 dBm, power control level 1 is 41 dBm, etc.) The measured signal of the target BTS (33) by the communication unit (20) may be −74 dBm.

The link signal loss, according to the invention, between the communication unit (20) and BTS (33) is determined by subtracting received signal (−74 dBm) from the transmitted signal level of the BTS (33) (46 dBm) to produce (46−(−74)) a value of 120 dB.

Link signal loss is then used to calculate a received signal level of the communicated signal at the BTS (33) (calculated communicated signal level at the BTS) by subtracting link signal loss from communication unit (20) transmitted power (43 dBm) to produce (43−120) a calculated communicated signal level at the BTS (33) of −77 dBm.

Since the calculated communicated signal level (−77 dBm) at the BTS (33) exceeds the target communicated signal level at the BTS (33) (of −83 dBm) by 6 dB, the power control level communicated to the communication unit (20) by the BTS (33) may be a power setting of 3. The desired C/I ratio is then used to determine an interference band from which to allocate a TCH for the communication unit (20).

To achieve a C/I ratio of 11 dB for the communication unit (20) operating at a power control level of 3 (−83 dBm), interference on the allocated channel must not exceed −94 dBm (−83 −11 dBm). Since an interference level of −94 dBm falls within interference band 3 (and some channels within band 3 may have measured values above −94 dBm) the proportional channel allocated to the communication unit (20) must be allocated from interference band 4.

Figure 4:
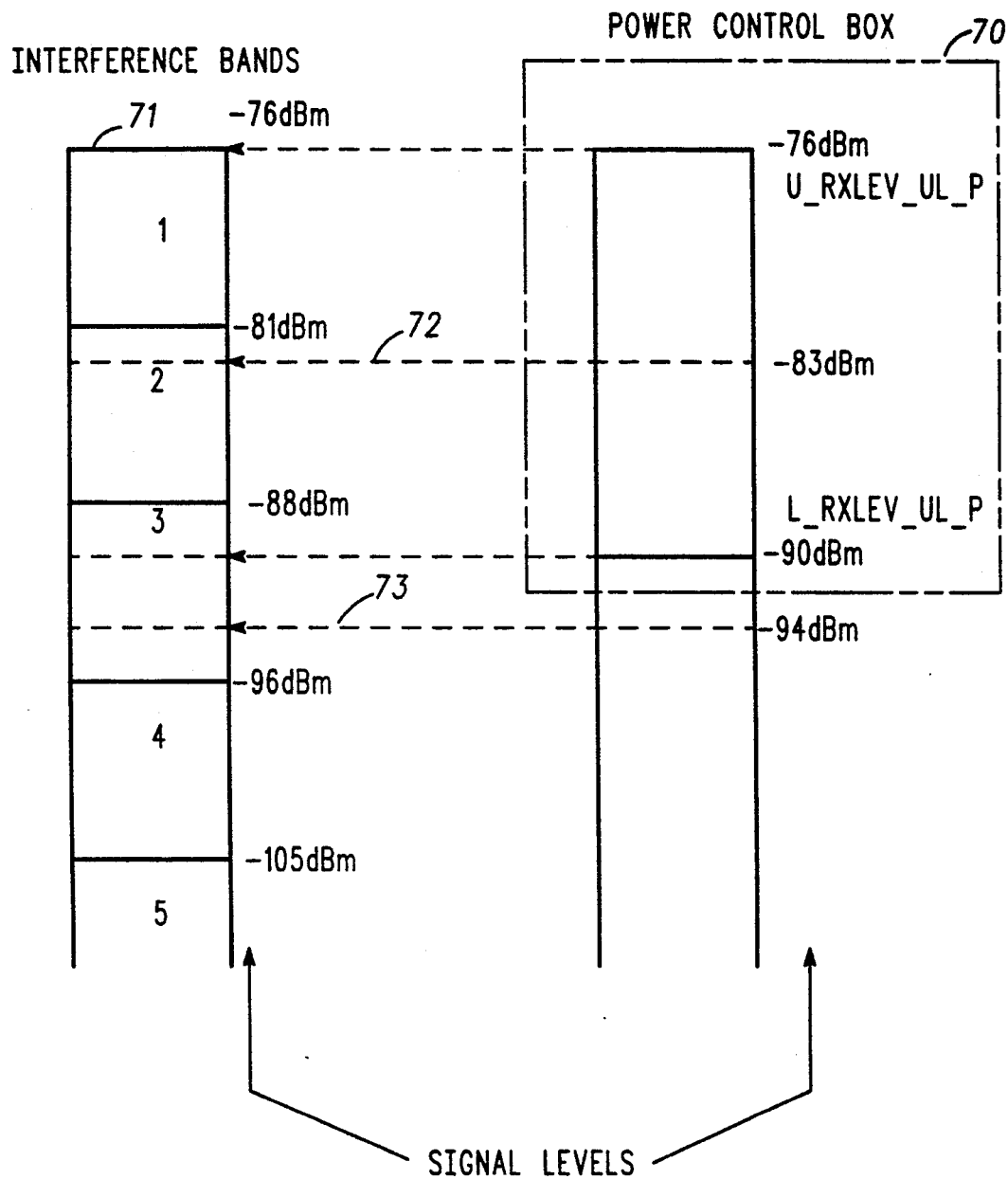
FIG. 4 depicts the relationship of power control box to interference bands under the invention for channel selection during handoff.

The example described above may be shown schematically as in FIG. 4. FIG. 4 depicts the relationship of the power control box (70) to the interference bands (71). The target communicated signal level at the BTS (33) (72) is shown to fall within interference band 2. The maximum interference level (73) for the target communicated signal at the BTS (33) (of −94 dBm) is also shown.

Under the invention, in the above example, the channels assigned to band 4 may be allocated first during handoffs. As the number of channels found within band 4 is depleted, channels within band 5 may be allocated in the alternative.

As the channels in band 4 and 5 are depleted, channels in interference bands 3, 2, and 1 may be allocated to communication units at an appropriate power setting (based upon maintaining the 11 dBm C/I ratio). Communication units measuring a relatively low link signal loss may also be assigned to interference bands 3, 2, or 1 at an appropriate power setting.

Figure 5:
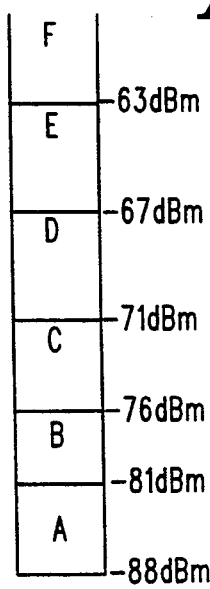
FIG. 5 depicts a grouping of interference bands for use with communication units requesting system access.

In another embodiment of the invention the proportional channel selection process may be used to identify TCHs for assignment to communication units (20 and 21) requesting access to the communication system (10). Use of the proportional channel selection process may reduce co-channel and adjacent channel interference among BTSs (31, 32, and 33) within a communication system (10) by reducing transmission power of communication units (20 and 21) to minimum levels (consistent with a desired C/I ratio). In implementing the process, a second, partially overlapping set of interference bands (FIG. 5) are created for use in servicing access requests from communication units that are located within the service coverage area (51, 52 and 53) of the BTS (31, 32, and 33). (The second set of interference bands are chosen to include channels of a slightly higher interference level than handoff interference bands on the assumption that requesting communication units are closer to the BTS than handoff communication units and are capable of providing better signal quality at the BTS.)

The second set of interference bands may also be used for handoff requests where the communication unit to be handed off has strayed a significant distance into the service coverage area of the transfer target cell before a need to handoff was determined. The second set of interference bands may also be used in the case of handoff where link signal loss to a target BTS is relatively low. (In both cases the detected signal at the target BTS would be of a relatively high quality.)

In the case of the second set of interference bands used for handoff requests, a determination may be made that a calculated communicated signal at the transfer target BTS exceeds a threshold. In such a case use of the second set of interference bands is justified by a signal from the handoff communication unit of sufficient magnitude to process the request for handoff in a manner similar to other access requests.

The second set of interference bands (FIG. 5) depicts two interference bands (A and B) that are coextensive with handoff interference bands 1 and 2 (FIG. 4). The overlap of interference bands A and B, and 1 and 2 becomes practical in application because the use of handoff bands 1 and 2 is reserved to overload situations where insufficient channels exist in bands 4 and 5. In the case where a handoff overload does exist at a BTS (31, 32, or 33) handoff requests may be accorded a channel priority (within interference bands 1 and 2) over access requests for channels in interference bands A and B.

In operation, allocation of a proportional channel from the second set of interference bands is, as above, determined by the BSC (30). Upon activation a communication unit (20 or 21) scans a frequency spectrum to identify the BTS (31, 32, or 33) with the largest relative RSSI, as the serving BTS (31, 32, or 33).

To request service, a communication unit (20), located with service coverage area 51, transmits an access request on the random access control channel (RACCH) associated with the BCCH of the serving BTS (31). After validation of the access request, the serving BTS (31) may transmit an identity (ID) of a set-up channel to be used by the requesting communication unit (20) for channel set-up. Following set-up, system access is granted to the requesting communication unit (20) through transmission, by the serving BTS (31), of an ID of a TCH to the requesting communication unit.

The identity of the TCH, as above in the case of handoff, may be determined by the BSC (30) (203) controlling the BTS (31). Link signal loss may be calculated (204) by the BSC (30), also as above, by a comparison of transmitted BCCH power versus received power. Communication unit transmitter power, according to the embodiment of the invention, is first determined at a minimum power setting. At the minimum power setting, a calculated communicated signal level at the BTS (31) (from the requesting communication unit (20)) is determined. A channel is then selected (205) from the most desirable interference band (A through F). The most desirable interference band (A through F) under the embodiment is the interference band having an upper threshold value which provides a desired C/I ratio (e.g. at least 11 dB) when compared with calculated communicated signal level.

If a TCH channel isn't available within the most desirable interference band (A through F) (at least 11 dB below the calculated communicated signal level) then the BSC (30) attempts to identify a TCH within the next most desirable interference band (with a higher level of interference) immediately above the most desirable interference band. If a TCH isn't available in the next most desirable interference band then the BSC (30) proceeds to a third interference band (above the second), etc.

Upon identifying an available TCH the BSC (30) may calculate a new power setting for the requesting communication unit (20) based upon the upper threshold of the selected interference band. Such a determination involves adding 11 dB to the upper threshold of the available interference band and calculating a power setting for the communication unit (20) based upon the result.

If the selected band is the most desirable band (at least 11 dB below the calculated signal level) then the power setting remains at the minimum setting. If the selected band is the next most desirable band (or higher) then a new power setting must be calculated.

As an example, the requesting communication unit (20) may have measured an RSSI of the serving BTS (31) of −54 dBm. The transmitted power of the BTS (31) may have been 40 Watts (46 dBm). Link loss, as such, would be 100 dBm.

The communication unit (20), as above, may have a maximum power setting (power setting 0) of 20 Watts (43 dBm) with reduced power settings in 2 dBm increments and a minimum power setting of 15 (13 dBm). The calculated communicated signal level (at power setting 15) in such a case is −87 dBm.

To achieve an acceptable C/I ratio of 11 dB the BSC (30) would search for a TCH within an interference band with an upper limit of −98 dBn. Since an interference band below −98 dBm isn't available the BSC (30) selects band A and searches for an available TCH.

If a TCH is available within band A then the BSC (30) calculates a communication unit power level based upon use of a channel from band A. Since the upper limit of band A is −81 dBm then the calculated power level at the BTS (31) becomes −70 dBm. Adding link signal loss to calculated power level (−70+100 dBm) produces a communication unit power level of 30 dBm. Since power control levels within communication units (20 and 21) are incremented in 2 dB steps the indicated power level of 30 dBm falls between power levels 6 and 7. Since a setting of 7 would not produce the required C/I ratio, the final power control setting for the communication unit (20) is 6.

As a further example, the requesting communication unit (20) may have measured an RSSI of the serving BTS (31) of −22 dBm. The transmitted power of the BTS (31) may have been 40 Watts (46 dBm). Link loss, as such, would be 68 dBm.

The communication unit (20), as above, may have a maximum power setting (power setting 0) of 20 Watts (43 dBm) with reduced power settings in 2 dBm increments and a minimum power setting of 15 (13 dBm). The calculated communicated signal level (at power setting 15) in such a case is −55 dBm.

To achieve an acceptable C/I ratio of 11 dB the BSC (30) would search for a TCH within an interference band with an upper limit of −66 dBm. Such a search would indicate that the selected channel should be from within interference band D. (Interference band D would be selected because a channel selected from band E may have channels above −66 dBm.)

If a channel were available within interference band D then the available channel would be allocated to the requesting communication unit (20). The communication unit (20) power setting in such case would be 15.

If a channel were not available within interference band D then the BSC (30) searches for a TCH in interference band E. Upon finding an available TCH within band E the BSC (30) calculates a power setting for the communication unit (20).

Since the upper limit of interference within band E is −63 dBm the calculated signal level at the BTS (31) is −52 dBm. Adding the link loss (68 dBm) produces a communication unit power level of 16 dBm. A communication unit power level of 16 dBm corresponds to a power setting of 13.

In another embodiment of the invention the BTS measures a signal quality factor, of signals from MSs, as a determinate of the desired C/I ratio. (Signal quality may be bit error rate, signal magnitude, etc.) When the signal quality factor of an MS exceeds a threshold (indicating that the desired C/I ratio has been lost) the BTS initiates an intra-cell handoff. Under the intra-cell handoff the BTS uses the proportional channel selection process to identify another available channel having the desired C/I ratio, for allocation to the MS. The BTS identifies such channel, as above, and hands the MS off to the available channel.

In another embodiment of the invention a fixed offset is added (or subtracted) from calculations involving link signal loss to accommodate fixed differences between downlink signal loss and uplink signal loss. Fixed differences may relate to a antenna elevations of BTS (31, 32, or 33) antennas or to local geographic conditions possibly affecting link loss.

We claim:

1. A method of achieving a desired C/I ratio within a cellular communication system, the method including the steps of:
   A) grouping unallocated channels having more similar than dissimilar measured interference characteristics into a plurality of interference groups;
   B) measuring a control signal on a downlink of a base site of the cellular communication system by a communication unit and communicating the measured signal value to the base site;
   C) determining a calculated link signal loss by comparing the communicated measured signal value with a magnitude of the control signal transmitted by the base site; and
   D) allocating a channel of the grouped unallocated channels to the communication unit based, at least in part, upon the calculated link signal loss and said interference groups to produce the desired C/I ratio.

2. The method as in claim 1 wherein the step of allocating a channel of the grouped unallocated channels to the communication unit further includes the step of determining a communicated signal level at the base site from the calculated link signal loss and a communication unit power setting.

3. The method as in claim 2 wherein the step of allocating a channel of the grouped unallocated channels to the communication unit further includes the step of selecting a channel from an interference group of the plurality of interference groups based upon the calculated link loss, the communication unit power setting and the desired C/I ratio.

4. An apparatus for achieving a desired C/I ratio within a cellular communication system, the apparatus comprising:
   A) means for grouping unallocated channels having more similar than dissimilar measured interference characteristics into a plurality of interference groups;
   B) means for measuring a control signal on a downlink of a base site of the cellular communication system by a communication unit and communicating the measured control signal value to the base site;
   C) means for receiving the measured control signal value from the communication unit and determining a calculated link signal loss by comparing the measured control signal value with a communicated control signal value from a transmission site; and
   D) means for allocating a channel of the grouped unallocated channels to the communication unit based, at least in part, upon the calculated link signal loss and said interference groups to produce the desired C/I ratio.

5. An apparatus for achieving a desired C/I ratio within a cellular communication system, the apparatus comprising:
   A) means for grouping unallocated channels having more similar than dissimilar measured interference characteristics into a plurality of interference groups;
   B) means for determining a communicated signal level at a base site from a calculated link loss and a communication unit power setting; and
   C) means for allocating a channel of the grouped unallocated channels to a communication unit based, at least in part, upon the calculated link signal loss and said interference groups to produce the desired C/I ratio.

6. The apparatus as in claim 5 wherein the means for allocating a channel to a communication unit further comprises means for selecting the channel from an interference group of the plurality of interference groups to produce the desired C/I ratio.

7. A method for reducing interference within a cellular communication system, the method comprising the steps of:
   A) grouping unallocated channels having more similar than dissimilar measured interference characteristics
   B) measuring a downlink control signal to produce a measured signal value and communicating the measured signal value to the base site;
   C) determining a calculated link signal loss by comparing the communicated measured signal value with a magnitude of the transmitted control signal; and
   D) allocating a channel of the grouped unallocated channels to a communication unit based, at least in part, upon the calculated link signal loss and the interference grouping to produce a desired carrier to interference ratio.

8. A method for reducing interference within a cellular communication system, the method comprising the steps of:
   A) grouping unallocated channels having more similar than dissimilar measured interference characteristics;
   B) determining a communicated signal level at a base site from a calculated link loss and a communication unit power level and
   C) allocating a channel of the grouped unallocated channels to a communication unit based, at least in part, upon the calculated link signal loss and the interference grouping to produce a desired carrier to interference ratio.

9. An apparatus for reducing interference within a cellular communication system, the apparatus comprising:
   A) means for grouping unallocated channels having more similar than dissimilar measured interference characteristics to produce a plurality of interference groups;
   B) means for measuring a downlink control signal and communicating the measured control signal value to a base site;
   C) means for receiving the communicated measured control signal value from the communication unit and determining a calculated link signal loss by comparing the measured control signal value with a communicated control signal value from a transmission site; and
   D) means for allocating a channel of the grouped unallocated channels to a communication unit based, at least in part, upon the calculated link signal loss and the interference grouping to produce a desired carrier to interference ratio at a relative minimum communication unit power level.

10. The apparatus as in claim 9 wherein the means for allocating a channel to a communication unit further comprises means for determining a communicated signal level at the base site from the calculated link loss and a communication unit power setting.

11. The apparatus as in claim 9 wherein the means for allocating a channel to a communication unit further comprises means for selecting the channel from an interference group of the plurality of interference groups to produce a desired C/I ratio.

* * * * *